Patented Nov. 12, 1929

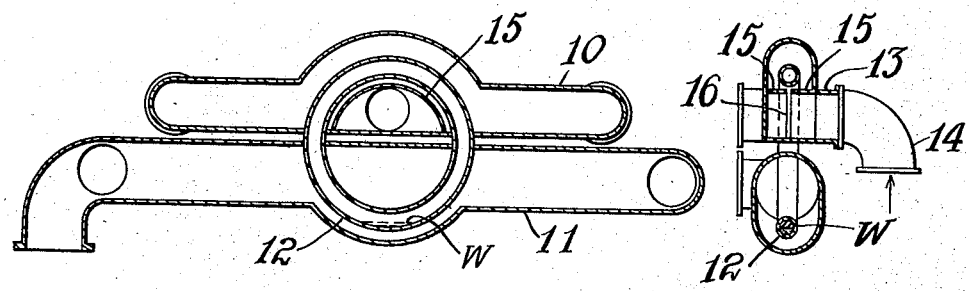
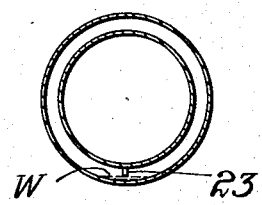
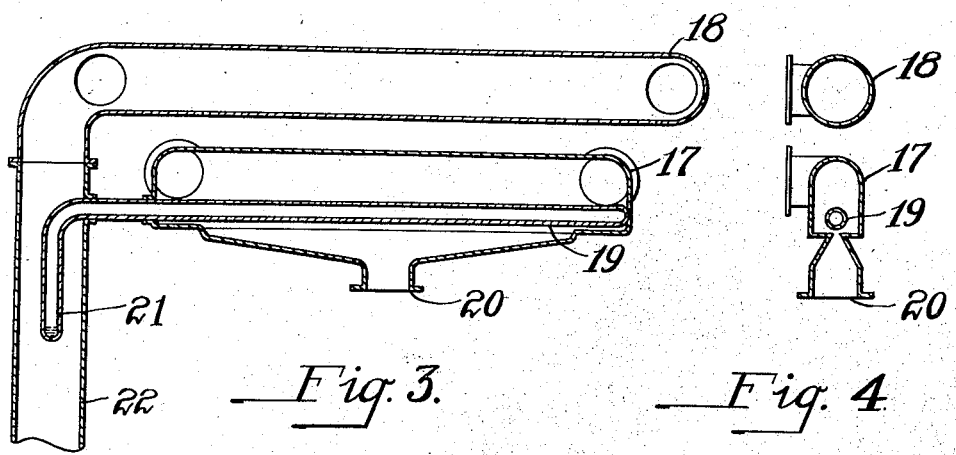

1,735,720

UNITED STATES PATENT OFFICE

BRYANT BANNISTER, OF PITTSBURGH, PENNSYLVANIA, ASSIGNOR TO BANNISTER MOTOR APPLIANCE COMPANY, OF PITTSBURGH, PENNSYLVANIA, A CORPORATION OF PENNSYLVANIA

MEANS FOR SUPPLYING HEAT TO THE MIXTURE DELIVERED TO INTERNAL-COMBUSTION ENGINES

Application filed April 3, 1926. Serial No. 99,550.

This invention relates to the conditioning of the mixture of liquid fuel and air delivered to internal combustion engines and particularly to means for transferring heat from the exhaust gases of automotive engines to the combustible mixture supplied to such engines.

The usual fuel supply system of modern internal combustion engines applied to automotive service comprises, first, a carbureter for proportioning the liquid fuel to the air making up the combustible mixture and, second, an intake system or manifold which conveys the carbureted mixture or charges thereof to the engine cylinders.

Aside from obtaining proper proportioning of the liquid fuel and air composing the combustible mixture, it is important to heat or condition the mixture before efficient combustion can be obtained. The extreme range in vaporizing characteristics of the different fuels now on the market does not bother the carbureter designer, but it does introduce some serious difficulties for the designers of the intake systems and the engines themselves.

Much progress has been made in the design of combustion chambers to meet the wide range of conditions, and many schemes have been proposed, and many have been tried out for heating or conditioning the mixture in its passage from the carbureters to the combustion chambers. I refer to such schemes as stoves applied to the exhaust gas systems for preheating the air, exhaust gas jackets for heating parts of the intake system, ingeniously located contacts between the exhaust and intake systems which present hot spots for impingement of the mixture and combinations of these schemes, none of which, however, have successfully solved the problem.

The driver of an automobile (I use the term "automobile" as inclusive of all automotive devices) usually does not associate his engine troubles with the fuel intake system. Automobile engine designers, however, do, since they realize that crank case dilution (which is a direct result of poor mixture conditioning) contributes largely to loose engine bearings, worn cylinders and in fact to most of the present day engine troubles.

It is in recognition of the evil of crank case dilution that so much attention has recently been paid to oil filters, air cleaners and such like devices.

The cardinal requirements for proper mixture or charge conditioning are as follows:—

First. The charges of air and fuel must be thoroughly mixed, and, before combustion starts, all of the liquid in the mixture must be vaporized. It must be remembered that it is not the liquid which burns, but the vapors which are produced by supplying the latent heat of vaporization to the liquid, converting it into a gas. It is because of this fact that much difficulty is experienced in starting and warming up in cold weather. It is now the usual practice to abnormally increase the quantity of liquid fuel during starting and warming up, but only the light components of the fuel are vaporized before combustion starts. Some of the heavier components pass down the cylinder walls into the crank case and some vaporize during combustion and by making the mixture too rich, retard combustion.

Second. The mixture must be brought to normal working condition in the shortest possible time after the engine is started. This is important in order to avoid the use of excessive fuel during the warming up period. The unvaporized and unburned fuel reaching the crank-case of the engine, carries with it particles of dirt from the combustion chamber which seriously impairs lubrication; and Third. During periods of operation when maximum power is not required of the engine, maximum economy should be obtained and when maximum power is required, it should be obtained with good economy.

The present day methods of preheating the air, of directing the mixture into contact with a hot spot and the other numerous schemes now made use of cannot possibly meet the requirements for all conditions of speed and load.

If the amount of heat provided for the mixture is proper for average running conditions (this is the usual method of design)

the amount of heat supplied during warming up periods is entirely inadequate and the amount of heat supplied during heavy loads is excessive. On the other hand, if the heat provided is correct for maximum loads, there is a decided deficiency for warming up periods and for normal running. This can be readily appreciated when it is understood that the gases exhausted from average automobile engines vary in temperature from about 400° F. to 1200° F. These gases are used for preheating the air and for heating the hot spots referred to so that the temperature of the hot spots follow this range in temperature quite closely and necessitate hot stove and hot spot proportions that are about right for normal running but entirely too small for starting and warming up and entirely too large for hard pulling.

Some attempts have been made to automatically compensate for the range in exhaust temperatures by using thermostats etc., but these attempts, so far as I am aware, have been complicated and have not been satisfactory.

An object of this invention is to provide a simple means or apparatus for transferring heat from the gases exhausted from an internal combustion engine to the mixture of liquid fuel and air entering the engine in such manner that the temperature of the mixture decreases as the load on the engine increases and increases as the load on the engine decreases.

A further object of this invention is to provide a means by which advantage is taken of the inherent pressure-temperature characteristics of a confined body of vaporizable fluid for transferring heat from the hot exhaust gases of an internal combustion engine to the mixture of liquid fuel and air delivered to the engine whereby the temperature of such mixture decreases as the load on the engine increases and increases as the load on the engine decreases.

I attain the above as well as other objects by means of the devices or apparatus for carrying the same into effect which I have described in the specification and illustrated in the drawings accompanying and forming part of this application.

My novel device for supplying heat to the mixture of liquid fuel and air delivered to the cylinders of internal combustion engines is applicable to engines of different designs and to engines in which the inlet and exhaust manifolds are variously arranged.

In Figures 1 and 2 of the drawings, I have illustrated one form of device for carrying my invention into effect in connection with an engine in which the inlet manifold is located above the exhaust manifold. Fig. 1 is a longitudinal and vertical section of such manifolds with my heater element incorporated in the manifolds and Fig. 2 is a transverse section through the parts shown in Fig. 1.

In Figs. 3 and 4, I have illustrated another form of device for carrying my invention into effect in an engine in which the exhaust manifold is located above the inlet manifold. Fig. 3 is a longitudinal and vertical section through such manifolds and shows the heater element applied thereto. Fig. 4 is a transverse section through the elements illustrated in Fig. 3. Figs. 5 and 6 are vertical sectional and transverse views respectively, of a heater element for use in carrying out a modification of my heater element, like the heater element illustrated in Figs. 1 and 2, is particularly applicable to engines in which the inlet manifold is located above the exhaust manifold.

Since a large supply of heat is available in the exhaust gases of engines of the type in connection with which this invention is of especial value, I prefer to utilize a portion of this waste heat and have, therefore, illustrated and will describe my method in connection with structures for utilizing such heat without any idea, however, of definitely limiting my invention.

This invention broadly consists in transferring heat to the mixture of liquid fuel and air delivered to engines of this type from the waste gases of combustion exhausted from such engines in such manner that the temperature of such mixture decreases as the temperature of the exhaust gases increases, and increases as the temperature of such gases decreases. The devices or means for carrying this invention into effect consists of a relatively thin walled, metal, tubular element which is closed or sealed, contains a relatively small amount of vaporizable liquid and which is located partly within the exhaust system and partly within the intake system of the engine.

This tubular element is of such form and is so arranged as to project into the inlet manifold in such a way that the mixture traversing the passage is caused to contact therewith. Another portion of said tubular member (and this is preferably the lowest portion) is arranged to project into the exhaust passage or manifold of the engine.

It is conceivable that under certain circumstances it may be desirable to have the portion of this tubular element or member which is located outside of the inlet manifold heated by other means than the exhaust gases. For instance, it might be desirable to have a separate heater for this purpose. Again, it may be desirable under certain conditions to apply an electric heating element to the portion of the tubular member located outside of the inlet manifold, for use while starting the engine when cold.

It will be seen that the principle of this invention can be applied in various ways, but for the sake of simplifying the specification, I have illustrated but two forms and but three types of tubular members.

With the idea of completely disclosing my invention in a manner to be easily understood, I have diagrammatically illustrated the manner of carrying out my method with different forms of devices suitable for different types of engine manifolds.

In Figures 1 and 2, 10 designates an internal combustion engine inlet manifold and 11 an exhaust manifold. 12 is the ring heater to which I have heretofore referred as the tubular member or element. This may be constructed from a piece of seamless tubing rolled into ring form with the ends thereof slightly telescoped and welded together.

Where the inlet manifold is located above the exhaust manifold as in Figs. 1 and 2, the two manifolds may be made as a single casting with the ring cast in place.

As shown in Figs. 1 and 2, the inlet portion 10 is provided with a flanged, tubular extension 13 by means of which the carbureter or other mixture forming device, not shown, may be connected thereto by means of an elbow 14, as is now usual.

In the inlet portion 10 and below that portion of the ring located therein, there are two semi-circular plates or baffle walls 15. These walls are concentric with the ring 12 and are spaced a slight distance apart as shown in Fig. 2 to provide a relatively narrow semi-circular slot 16 through which the mixture from the charge forming device must pass on its way into the inlet portion 10 proper. This slot is located directly in line with that portion of ring 12 which is above the same.

After the ring is formed up and welded, the air contained therein is preferably withdrawn through a small opening formed for that purpose and a small quantity of fluid, preferably water, is introduced, after which the ring is entirely sealed. The quantity of water to be introduced is determined by the pressure which it is desired to carry within the ring.

In Figs. 3 and 4, 17 denotes an inlet manifold and 18 an exhaust manifold located above the inlet manifold. In such an arrangement where the inlet manifold is located below the exhaust manifold, the ring form of heater does not lend itself as readily as the form shown in Figs. 3 and 4.

In this form, while the heater element is tubular and has its ends closed, it is of substantially L form having one long and one short leg. The long leg 19 is positioned along the median line of the inlet manifold above intake 20, while the short leg 21 is located within the downtake 22 connected to the exhaust manifold. In the form shown in Figs. 3 and 4, it is not necessary to cast the heater element in the manifold elements. The manifolds can be provided with bosses, if desired, which can have holes either cored or drilled in them, to receive the heater element. After the heater element is placed in position, it can be welded to the bosses in any well-known manner.

When the form of heater element shown in Figs. 3 and 4 is used, it will be evacuated in the same manner as the ring form and will have a relatively small amount of water introduced and sealed therein. The water in the three heater elements shown is indicated at W.

In the heater element shown in Figs. 5 and 6, a baffle 23 is shown, for preventing circulation within the ring.

*Operation*

Assume that the engine is equipped with the device of Figs. 1 and 2, is cold and that the ring contains a small amount of water in the bottom thereof. Upon starting the engine the exhaust gases will immediately begin to warm up the thin walled ring and the water contained therein. Within a short time after starting the engine, the ring will have warmed sufficiently to convert the water therein into steam and the ring will present a hot surface against which the mixture of fuel and air is directed by annular distributing slot 16.

The pressure of the steam will depend upon the heat imparted to the ring, the volumetric capacity of the ring and the quantity of water within the ring. If we assume that the volumetric capacity is 23 cubic inches and that the desired pressure to be maintained within the ring is 50 lbs. per square inch gauge, the ring should contain .002 lbs. of water. If the ring receives sufficient heat from the exhaust gases to maintain a steam pressure of 50 lbs. the temperature will be approximately 298° F.

With the form of ring shown in Figs. 1 and 2 (with no constriction therein), it is possible for the exhaust gases to supply heat at a greater rate than can be withdrawn by the incoming mixture of liquid fuel and air. Under this condition, the steam will become superheated as soon as all the water is evaporated, and the hottest steam will be within that portion of the ring which is located within the exhaust manifold. In the top of the ring or in that portion which is located within the inlet manifold where heat is being abstracted by the mixture contacting therewith, the temperature will be somewhat reduced. To illustrate the action, let us assume that the pressure is 50 lbs. per square inch within the ring and that the temperature in the lower part is raised to 600° F. which would represent approximately 300° of superheat and that the incoming mixture of liquid fuel and air contacting with the upper portion of the ring is absorbing sufficient heat to reduce the ring temperature to 400° F., which is still approximately 100° above saturation temperature. The steam in the bottom section of the ring will have a volume of 9.65 cubic feet per pound, while the steam in the upper section will have a volume of 7.7 cubic feet per pound, in other words, the heaviest steam will be at the top of the ring.

Obviously, such a condition is unstable and will cause circulation, or what is known as convection currents within the ring. The cooler steam from the top will flow to the bottom where heat is added and the hotter steam will rise on the opposite side of the ring to give up heat to the incoming charge.

The exact condition within the ring can be governed by proportioning the surface areas of those portions lying within the intake and exhaust manifolds. If high temperatures are desired, the portion within the exhaust manifold can be made large and that within the intake small. If the reverse condition is desired, the portion within the exhaust manifold can be made small and that within the intake manifold large.

If the steam cannot circulate rapidly, i. e., if the setting up of convection currents is prevented or substantially prevented, it must give up its heat by condensation.

If the steam is not free to circulate so that it can give up its sensible heat (represented by the degree of superheat), it will condense slightly in that portion within the inlet manifold and in this way give up the latent heat of vaporization. The water will run back to the hot side of the ring to be re-evaporated. The latent heat of vaporization of steam at the assumed pressure of 50 lbs. per square inch is 911 B. t. u.'s per pound. A pound of steam, therefore, at 298° F. will give up 911 B. t. u.'s in changing to a pound of water at the same pressure and temperature.

Where the ring is provided with a constriction, as illustrated in Figs. 5 and 6 or is made up of varying cross sections, in order to give varying surface areas, as just above described, the temperature of that portion of the ring within the intake manifold will always be approximately 298° F. This temperature can obviously be varied by varying the quantity of water placed within the ring initially. If sufficient water is placed within the ring to satisfy the conditions for 100 pounds gauge pressure, the resultant temperature of saturated steam will be 338° F.

In the form of heater element shown in Figs. 3 and 4, the heater will operate only at saturation temperatures. In this form, steam is produced in the vertical leg 21 and heat is absorbed from the horizontal leg 19 by the incoming mixture entering intake 20 of the inlet manifold.

In this L form of heater, the temperature in the horizontal leg can rise to that corresponding to the pressure which the water within the heater will maintain. The temperature of the leg 21 within the exhaust passage may, however, rise to a much higher temperature and the steam therein may become superheated, but since substantially no circulation occurs, this will not be felt in the horizontal leg 19.

The heater element, no matter of which of the forms, can be so designed that with an increase in load, the heat absorbed by the mixture does not increase as rapidly as the quantity of mixture increases under increasing load with the result that as the load increases, the temperature of the mixture delivered to the engine cylinders decreases. This is the ideal condition, since it insures the highest temperatures during fractional loads and high volumetric motor efficiency during full loads.

Since the air is withdrawn from the ring or other form of heater element during its construction, the first heat absorbed produced steam which fills the entire element. The temperature of course, corresponds to the steam pressure. For instance, at one pound absolute pressure, the temperature of the element would be 100° F. and this would materially aid in warming the mixture on a cold day. At seven pounds absolute pressure, the temperature would be 180° F. and at atmospheric pressure, 212° F. The temperature continues to rise rapidly until the maximum is reached, for which the element is designed. If 50 pounds is the maximum, then the maximum temperature would be 298° F.

It will be understood that practically any volatile fluid can be used within the heater element in place of water and if a form of heater is utilized in which rapid circulation can occur, a fixed gas may be employed in place of a volatile fluid.

It will be apparent that different internal combustion engines have cylinders of different size or displacement and that it may be desirable to designate different speeds of the same engine as those at which the engine is to operate with the best economy. It is, therefore, apparent that the rate of flow of the combustible mixture to the working passages of the engine not only varies in different designs of engine but that it varies in the same engine under different load or speed conditions. The rate of flow of combustible mixture, however, can be readily determined by engineers and this rate of flow can be readily determined for various conditions or assumed conditions of operation. If the engineer is careful to so design the intake passages of the engine that the mixture entering contacts or moves in close proximity with the heating element—i. e., the upper portion of the ring 12 of Figures 1 and 2 or the heat delivering leg 19 of the L-shaped tube of Figures 3 and 4—he can readily calculate or otherwise determine the rate of heat transfer under various assumed or encountered conditions and can thereby determine the appropriate volumetric capacity of the heating element, the quantity of water or other liquid to be confined therein and the appropriate areas to be exposed respectively to the source of heat and also within the intake passage in order to obtain the desired heat transfer to the mixture under the varying conditions encountered. It will be apparent that by taking advantage of my invention, the mixture may be quickly heated at the time of starting a cold engine and that the mixture entering the cylinders will be actually hotter under conditions of low speed or low power than under conditions of operation selected for maximum economy, and that the mixture will decrease in temperature as the speed of the engine increases. It will also be apparent that while the temperature of the mixture heating element remains approximately constant under wide variations in the temperature of the exhaust gases it in fact decreases in temperature as the power developed by the engine increases or as the source of heat,—i. e., the exhaust gases,—gets hotter. With these facts in mind, it will be apparent that my invention may be employed in connection with internal combustion engines of various designs, and that it may also be employed to obtain the best economies at different speeds in engines of the same or identical design.

Having thus described my invention, what I claim is:—

1. The combination with means for delivering a mixture of liquid fuel and air to an internal combustion engine and means for conducting the exhaust gases therefrom, of a hollow, sealed, metallic element located partially within each of said means and a body of vaporizable liquid within said element and but partially filling the same.

2. The combination with the intake and exhaust systems of an internal combustion engine, of a hollow metal device containing substantially no air and having but a small part of its interior filled with vaporizable liquid; said device being sealed and located partly within each of said systems so that heat from the exhaust gases traversing the exhaust system is conveyed by the vaporized liquid within the device to the mixture of liquid fuel and air traversing the intake system.

3. The combination with conduits for conducting exhaust gases from an internal combustion engine and a mixture of liquid fuel and air to said engine, of a sealed metallic agent partly located within each of said conduits and containing a body of vaporizable liquid which when not vaporized fills but a small part of such agent.

4. The combination with the inlet manifold of an internal combustion engine, of a relatively thin walled metal container so positioned that one portion of the same is within and one portion outside of said manifold, fluid sealed within said container and which in amount is relatively small when compared with the volumetric capacity of the container and means for applying sufficient heat to the container outside of said manifold to vaporize said fluid whereby heat is transferred to that portion of the container within the intake manifold.

5. The combination with the intake and exhaust manifolds of an internal combustion engine, of a hollow metal device having an upper portion thereof located in the intake manifold and a lower portion located in the exhaust manifold; said hollow device being substantially free from air and having sealed therein a relatively small amount of vaporizable liquid as compared with the volumetric capacity of the hollow device; that portion of the device within the intake manifold being located in the path of the combustible mixture traversing said manifold and that portion located within the exhaust manifold being in the path of exhaust gases traversing said exhaust manifold whereby heat from said exhaust gases is caused to vaporize said liquid and transfer heat from said exhaust gases to the combustible mixture traversing the intake manifold.

6. An apparatus for conditioning a mixture of liquid fuel and air to be delivered to an internal combustion engine, comprising a hollow metallic device containing substantially no air and having but a small part of its interior filled with vaporizable liquid, said device being sealed and located partly within the mixture to be conditioned and provided with means for vaporizing the said liquid, the said mixture adapted to decrease the temperature of the said vapor, as the amount of the said mixture delivered to the engine is increased.

7. In combination with the combustible mixture delivery passages of an internal combustion engine, a sealed tube having a relatively small quantity of vaporizable liquid located therein and extending into said passage, means remote from said passage for applying heat to said tube to vaporize liquid contained therein, and means for directing mixture moving through said delivery passage into heat exchange relation with the portion of said tube extending into said passage.

8. In combination with an internal combustion engine and the combustible mixture delivery passages thereof, a sealed tube having a vaporizable liquid confined therein, extending into said inlet passage and so formed as to substantially prevent convection currents being set up therein, means remote from said passage for applying heat to said tube to vaporize the liquid contained therein, and means for directing the flow of mixture through said passage into heat exchanging relation with the portion of said tube located in said passage.

9. In combination with an internal combustion engine and the combustible mixture delivery passage thereof, a sealed tube extending into said passage and having a vaporizable liquid confined therein, means remote from said passage for heating said tube to vaporize liquid contained therein, and means for substantially checking a convection flow of the vapor generated within said tube.

10. In combination with an internal combustion engine and the fuel delivery passage thereof, a sealed tube extending into said passage and having a vaporizable liquid contained therein, means for heating said tube to vaporize liquid contained therein, and a baffle within said tube for substantially preventing the setting up of convection currents within said tube.

11. In combination with an internal combustion engine and the inlet and exhaust passages thereof, a sealed tube containing a confined liquid exposed to the heat of the exhaust gases traversing said exhaust passage and extending into said inlet passage, and means for directing the combustible mixture traversing said inlet passage into heat exchanging relation with the portion of the tube located in said inlet passage.

12. In combination with an internal combustion engine and the inlet and exhaust passages thereof, a heating element exposed to the heat of exhaust gases traversing said exhaust passage and extending into said inlet passage, and means for maintaining the portion of said element in said inlet passage at an approximately constant temperature independently of the amount of combustible mixture traversing said inlet passage.

In testimony whereof, I have hereunto subscribed my name this 1st day of April, 1926.

BRYANT BANNISTER.